United States Patent [19]

Birkholz et al.

[11] Patent Number: 4,834,927

[45] Date of Patent: May 30, 1989

[54] METHOD AND APPARATUS FOR PRODUCING AN EAR IMPRESSION

[75] Inventors: Ulrich Birkholz, Bayreuth; Christof Haertl, Neunkirchen; Peter Nassler, Eckental, all of Fed. Rep. of Germany

[73] Assignee: Siemens Aktiengesellschaft, Berlin and Munich, Fed. Rep. of Germany

[21] Appl. No.: 49,289

[22] Filed: May 13, 1987

[30] Foreign Application Priority Data

May 16, 1986 [DE] Fed. Rep. of Germany ....... 3616534

[51] Int. Cl.[4] .............................................. B29C 39/10

[52] U.S. Cl. .................................. 264/134; 264/161; 264/222; 264/227; 264/277; 425/275; 249/55; 249/91; 249/175; 249/184

[58] Field of Search ............... 264/219, 220, 222, 225, 264/226, 227, 273, 275, 277, 278, 279, 279.1, 271.1, 134, 161; 181/129, 130, 135, 136; 425/275; 249/55, 91, 175, 184

[56] References Cited

U.S. PATENT DOCUMENTS

| | | | |
|---|---|---|---|
| 1,753,817 | 4/1930 | Aber | 264/222 |
| 2,203,105 | 6/1940 | Roberts | 264/222 |
| 3,097,059 | 7/1963 | Hoffman | 264/222 |
| 3,208,102 | 9/1965 | Rubio | 264/222 |
| 3,345,737 | 10/1967 | Gordon | 264/222 |
| 3,440,314 | 4/1969 | Frisch | 264/222 |
| 3,475,528 | 10/1969 | Parks | 264/222 |
| 3,513,269 | 5/1970 | Wilson | 264/222 |
| 3,833,701 | 9/1974 | Johnson | 264/222 |
| 4,014,971 | 3/1977 | Perkins | 264/222 |
| 4,091,067 | 5/1978 | Kramer | 264/222 |
| 4,098,277 | 7/1978 | Mendell | 264/222 |
| 4,372,904 | 2/1983 | Gunn | 264/222 |
| 4,472,342 | 9/1984 | Carr | 264/222 |
| 4,569,812 | 2/1986 | Werwath | 264/222 |
| 4,617,429 | 10/1986 | Bellafiore | 264/222 |
| 4,652,414 | 3/1987 | Schlaegal | 264/222 |
| 4,712,245 | 12/1987 | Lyregaard | 264/222 |

FOREIGN PATENT DOCUMENTS

| | | |
|---|---|---|
| OS1487272 | 3/1969 | Fed. Rep. of Germany . |
| G8518681.3 | 7/1986 | Fed. Rep. of Germany . |
| 2084072 | 4/1982 | United Kingdom . |
| 2101521 | 1/1983 | United Kingdom . |

OTHER PUBLICATIONS

Hearing Instrument, vol. 35, No. 1, Jan., 1984, "A tool for the optimization of hearing aid fittings", pp. 12-16.

*Primary Examiner*—James Lowe
*Assistant Examiner*—Jeremiah F. Durkin, II
*Attorney, Agent, or Firm*—Hill, Van Santen, Steadman & Simpson

[57] ABSTRACT

On the basis of a hollow die including over-shell and a cap drawn onto a proximal connector of the die, an ear impression is produced directly in the auditory canal that is filled with ear impression material. Displaced ear impression material thereby flows through a channel in the cap into the hollow interior of the die. A negative is produced from the ear impression together with a screwed-on fixing star, this negative containing impressions of the points of the fixing star. After injection of otoplastic material and repositioning of a fixing star with a die, over-shell and cap into the fixing depressions, a finished otoplastic shell can then be produced from the negative.

10 Claims, 3 Drawing Sheets

METHOD AND APPARATUS FOR PRODUCING AN EAR IMPRESSION

BACKGROUND OF THE INVENTION

The invention is directed to a method and to an apparatus for producing an ear impression and for further processing of the ear impression into an otoplastic shell.

German Utility Model application No. 85 18 681.3, corresponding to copending U.S. Ser. No. 875,929, now U.S. Pat. No. 4,739,512, assigned to the assignee of the present application discloses an in-the-ear hearing aid module that can be inserted into the cavity of an over-shell on which the otoplastic shell is applied.

SUMMARY OF THE INVENTION

An object of the present invention is to provide a method and an apparatus with whose assistance an ear impression of the module for an in-the-ear hearing aid module including an over-shell can be produced in an optimally simple and fast way directly in the ear and whereby the appertaining otoplastic shell can be manufactured therefrom.

This object is achieved by first drawing an over-shell having a proximal hole onto a die simulating the outside contour of the housing of an in-the-ear hearing aid module, the die having a hollow interior, having a plate with a stem detachably connected to its distal end, and having an connector at its proximal end, the over-shell being drawn thereover such that the connector at least partially projects through the hole. Next, a cap having a through channel is put in place on that part of the connector projecting from the hole. Then, an ear impression material is introduced into an auditory canal of a hearing-impaired person. Next, the combination of the die, the over-shell and the cap is introduced into the ear impression material situated in the auditory canal, whereby displaced ear impression material is pressed in distal direction, being partially pressed directly out of the auditory canal and partially through the through channel of the cap into the hollow interior of the die. Then, the ear impression is obtained after the ear impression material has hardened and after the combination of die, over-shell, cap and ear impression material has been removed, as well as after the cap with the stem has been screwed off, being obtained after the removal of excess ear impression material.

The object of being able to manufacture an otoplastic shell from the ear impression is achieved by applying a positioning part to the die in lieu of the plate with the stem, the positioning part leaving position marks behind in the negative of the ear impression. The negative of the ear impression together with its position marks is produced by surrounding the ear impression with negative casting material. Then fluid otoplastic material is cast into the negative. Next, a combination of a die having an attached positioning part, an over-shell and a cap without a through channel is immersed into the fluid otoplastic material and is positioned such that the positioning part lies in alignment with the position marks of the negative of the ear impression. Then after the hardening of the otoplastic material, a blank is removed from the negative of the ear impression. The positioning part may include projecting otoplastic material which is distally removed from the blank and the proximal end of the blank is freed of otoplastic material and the cap is removed as well such that the die can be easily removed in the distal direction so that the over-shell including the otoplastic material seated thereon remains as a finished otoplastic shell.

It is preferred that the positioning part comprise a fixing star, the fixing star having points which leave fixing troughs behind in the negative as position marks. The fixing star and the ear impression are to be inserted into a fitting retaining plate such that the star points project out of the rim of the retaining plate so that the ear impression and the points of the fixing star are surrounded with negative casting material on the retaining plate. Also, after the negative casting material has hardened the retaining plate together with the fixing star and the ear impression are removed from the hardened negative casting material, so that the negative of the ear impression and of the retaining plate remains together with the fixing depressions deriving from the points of the fixing star.

It may also be desirable to apply an adhesive to the over-shell for facilitating the adhesion of the ear impression material before the combination composed of the die, over-shell and cap is introduced into the ear impression material.

An apparatus for implementing the above described method comprises a die simulating the outside contour of an in-the-ear hearing aid module, the die having a hollow interior, having a plate with a stem detacably detached at its distal end, and having a connector at its proximal end. An over-shell for the die which includes a proximal hole for the connector is provided and a cap implaceable onto the connector and including a through channel into the hollow interior of the die completes the assembly. The apparatus may also include a positioning part that can be mounted on the die instead of the plate which has the stem and the positioning part would leave the position mark behind in the negative of the ear impression. Specifically, the fixing star having points which leave fixing depressions behind in the negative as position marks is preferably utilized. Also, a retaining plate which fits to the fixing star with attached ear impression is useful, the fixing star being insertable such into the retaining plate that the star points project out of the rim of the retaining plate.

The hollow die as well as the through channel in the cap allow the production of an ear impression directly in the auditory canal wherein the die (including over-shell and cap) simulating the later in-the-ear hearing aid module is already inserted, since excess ear impression material can flow via the through channel of the cap into the interior of the hollow die. A displacement of excess ear impression material into the back auditory canal is thereby avoided. An impression directly in the auditory canal, however, is especially advantageous since it is particularly precise in reflecting the tissue contours with respect to the latter in-the-ear hearing aid module which is to be inserted together with an otoplastic shell. In the standard ear impression method, i.e. production of an ear impression without inserted substitute structure for the later in-the-ear hearing aid module, an ear impression merely reflecting the unstressed situation of the tragus as well as of the auditory canal is obtained that only approximately corresponds to the stressed condition (due to the inserted hearing aid module). An otoplastic shell to be produced in accord with the invention is thus matched to the actual conditions of the auditory canal in a truer-to-nature fashion than is an otoplastic shell produced in accord with the normal impression method.

BRIEF DESCRIPTION OF THE DRAWINGS

Further advantages and details of the invention derive from the following description of an exemplary embodiment with reference to the drawing.

DESCRIPTION OF THE PREFERRED EMBODIMENTS

Figure 1:
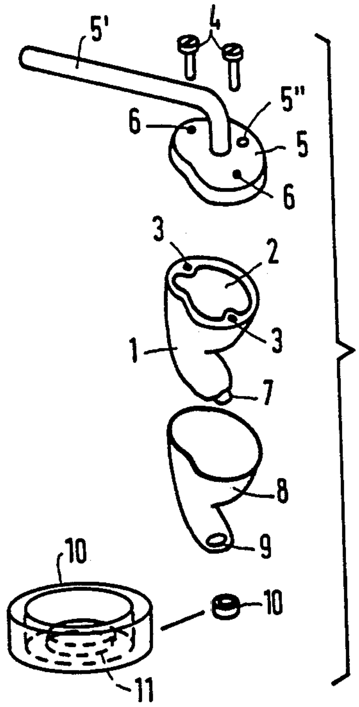
FIG. 1 is a die comprising a distally screw-connectible plate with stem, an over-shell and a cap that are utilized for producing an ear impression in accord with the invention, shown in an exploded view.

In FIG. 1, a die 1 of, for example, plastic encompasses a hollow interior 2 as well as screw holes 3 at the distal end. Screws 4 fit into the screw holes 3. A plate 5 including a stem 5' and a vent hole 5'', which corresponds to an end face (face plate) can be screwed to the distal die end with these screws 4 via bores 6.

At its proximal end, the die 1 includes a connector 7 which, after an over-shell 8 has been inverted thereover, projects at least partially out from a proximal hole 9 of the over-shell 8. A plastic cap 10 is secured on that part of the connector 7 projecting from the hole 9, this plastic cap containing a central through channel 11 for connection to the hollow interior 2 of the die 1.

For producing an ear impression of the invention, the auditory canal of a hearing-imparied person is injected with an ear impression material (for example, silicone compound) after the insertion of a tampon. The combination of die 1 with screwed-on plate 5 with stem 5', over-shell 8 and cap 10 composed of the component parts of FIG. 1 is then carefully introduced into the ear impression material in the auditory canal. Before this, the over-shell 8 was also coated with a suitable adhesive (for example, a silicon resin having a highly volatile solvent such as, for example, adhesive pergamum) which is intended to facilitate the adhesion of the over-shell to the ear impression material. Displaced ear impression material is pressed in distal direction, being partly pressed directly from the auditory canal and partly through the through channel 11 of the cap 10 into the hollow interior of the die 1 where, after crosslinking, it remains as a relatively soft plastic (non-sticky) material. The air thereby displaced can escape via the vent hole 5''. Excess ear impression material is thus not forced out in the direction toward the inner ear. Due to the cap, a central opening derives later in the otoplastic still to be manufactured, this central opening guaranteeing that the sound exit opening of the in-the-ear hearing aid always lies at a certain minimum distance from the skin tissue in the ear when the in-the-ear hearing aid is inserted. Optimum acoustic coupling to the inner ear is thereby guaranteed.

Figure 2:
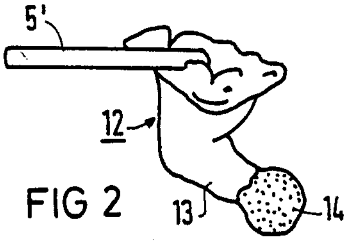
FIG. 2 is an ear impression of the invention.

After the ear impression has hardened, it can be removed from the auditory canal. As example of such an ear impression 12 is shown in FIG. 2. The ear impression material is referenced as 13 and the tampon is referenced 14. The stem 5' of the component part assembly of FIG. 1 enclosed in the ear impression 12 projects from the ear impression 12.

Figure 3:
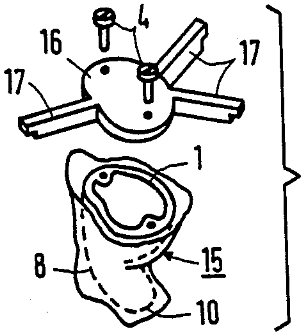
FIG. 3 is the cleaned ear impression after screwing the stem off, together with a fixing star that can be screwed on instead of the stem.

A cleaned ear impression 15 is shown in FIG. 3 is obtained after removal of the tampon 14 as well as of the ear impression material 13 extending beyond the distal end of the die 1, as well as after the plate 5 together with the stem 5' has been subsequently screwed off.

Figure 4:
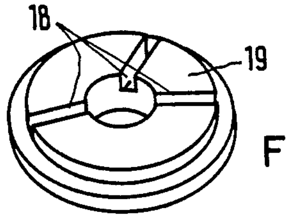
FIG. 4 is a retaining plate mating with the fixing star.

A fixing star 16 can be screwed onto the cleaned ear impression 15 with the screws 4. The fixing star 16 includes graduated star points 17. The fixing star 16 fits into a star-shaped recess 18 of a retaining plate 19 illustrated in FIG. 4.

Figure 5:
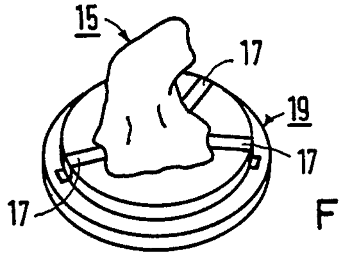
FIGS. 5 and 6 manufacture of a negative of the ear impression together with the fixing star and retaining plate.

As shown in FIG. 5, the fixing star 16 together with the cleaned ear impression 15 can be inserted such into the recess 18 of the retaining plate 19 that the star points radially project slightly from the retaining plate.

Figure 6:
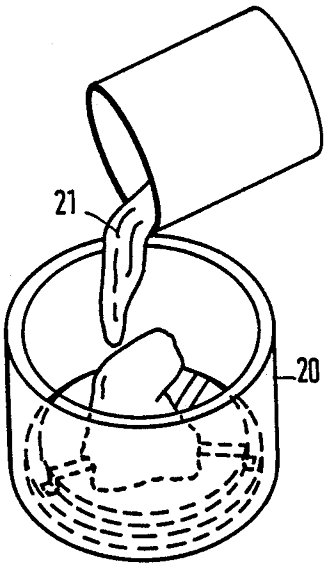

The arrangement of FIG. 5 (after being previously dipped into wax, as warranted) is placed into a round casting mold 20 that is open at two sides and, as indicated in FIG. 6, is then surrounded with negative casting material 21 for producing a negative of the ear impression 15. The negative casting material 21 can be plaster but can also be a silicone.

Figure 7:
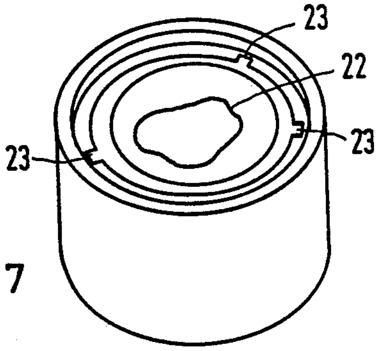
FIG. 7 is the casting form of the negative with precise position marks for the re-attachment of the fixing star.

FIG. 7 shows the finished negative after the removal of the ear impression together with the retaining plate. One can see that the star points 17 have left fixing troughs 23 in the negative impression.

The actual otoplastic shell can now be produced.

To this end, an over-shell 27 is again drawn over a die 24 to which a fixing star 25 is screwed with screws 26, being drawn thereover such that the connector 28 of the die 24 at least partially projects from the proximal hole 29 of the over-shell. A cap 30 is again pulled over the connector. The die 24 with over-shell 27, or respectively, the fixing star 25 as well exactly correspond to the corresponding component parts 1, 8 or, respectively, 16 that had also been utilized for producing the ear impression or, respectively, the negative of the ear impression. In principle, the previously used parts can be reemployed insofar as the die 1 together with the over-shell 8 have been freed of ear impression material after the negative has been produced. The cap 30 differs from the cap 10 in that it does not have a through channel. This is to prevent the extremely thin-bodied otoplastic material from penetrating into the hollow interior of the die 24. If this happened the otoplastic material would penetrate into cracks between die and over-shell or, respectively, would also penetrate into the fixing star and adhere to the latter such that the die could not be removed from the over-shell.

Figure 8:
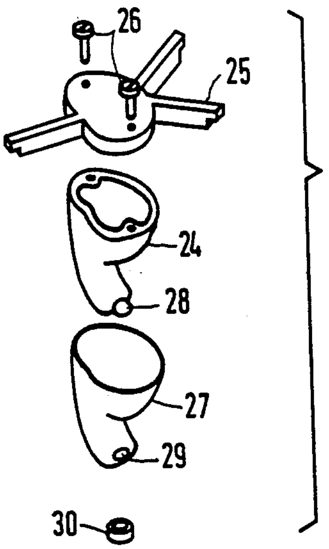
FIG. 8 is a die with screw-connectible fixing star, an over-shell and a cap without through opening that are utilized for the production of an otoplastic shell of the invention, shown in an exploded view.
Figure 10:
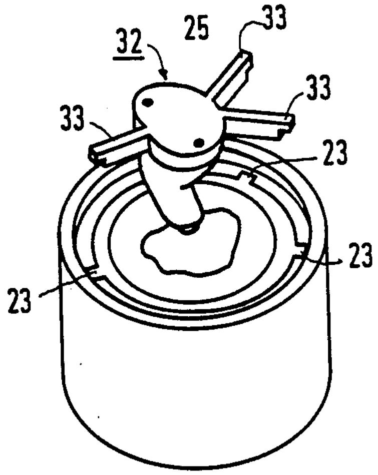
FIG. 10 is the immersion of the assembled arrangement of FIG. 8 into the fluid otoplastic material.
Figure 9:
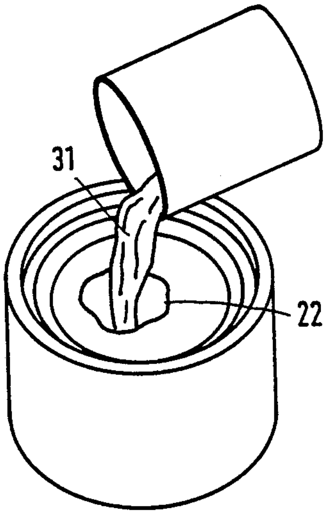
FIG. 9 is the casting-out of the negative impression of FIG.7 with fluid otoplastic material.

For producing the otoplastic shell, the negative 22 of the ear impression is filled with fluid otoplastic material 31 (for example, polymethyl methacrylate, such as acrylic PMMA), as indicated in FIG. 9. Subsequently, the part 32 of FIG. 10 composed of the component parts of FIG. 8 is turned into the fluid otoplastic material 31 situated in the negative 22. The correct final position is achieved in that the points 33 of the fixing star 25 are brought into coincidence with the position of the fixing troughs 23. The part 32 now lies exactly in the same position as in the auditory canal.

Figure 11:
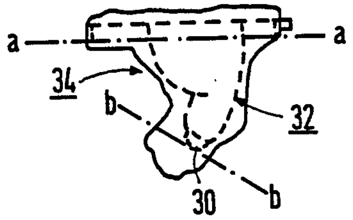
FIG. 11 is the further processing of the blank for the purpose of producing the finished otoplastic.

After the otoplastic material 31 has hardened, the blank 34 of FIG. 11 can be removed. The fixing star 25 including any projecting otoplastic material is then distally removed from the blank along the line a-a. Correspondingly, the otoplastic material at the proximal end is removed along the line b-b up to the end face of the cap 30. The cap 30 can then be levered out with a fine screwdriver.

Figure 12:
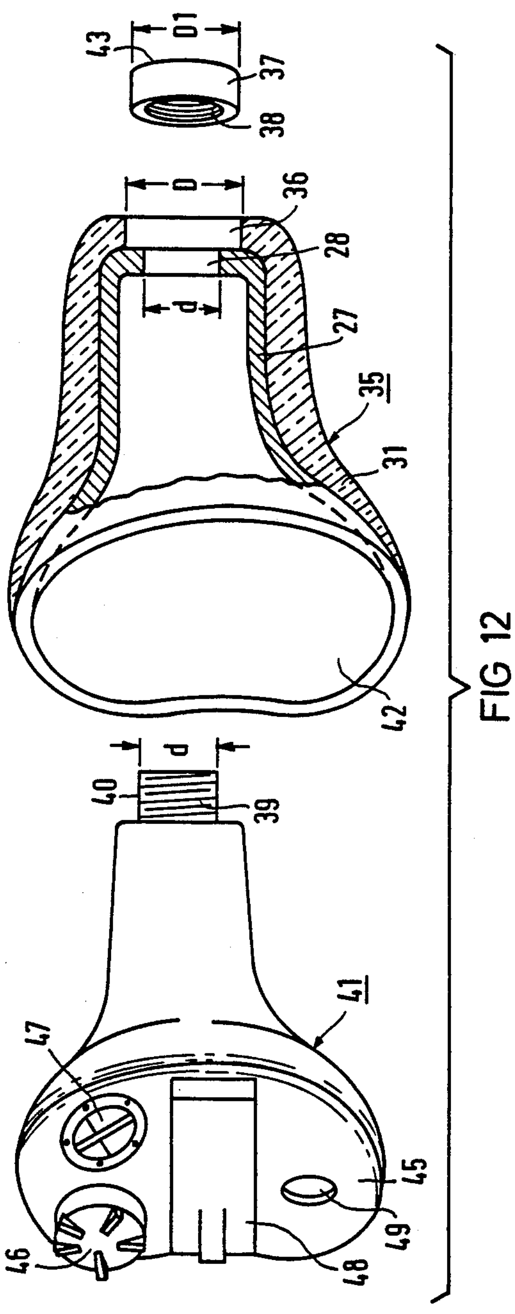
FIG. 12 is an in-the-ear hearing aid module together with a finished otoplastic and a cerumen cover that can be screwed onto a threaded neck of the module, shown in an exploded view.

After rounding the edges and polishing, the result is a finished otoplastic shell 35 as shown, for example, in FIG. 12.

As may be seen from FIG. 12, the proximal hole 28 of the over-shell 27 lies essentially centrally in the finished otoplastic 35. The diameter D of the proximal opening 36 of the otoplastic material 31 corresponds to the diameter of the cap 30.

The smaller diameter D is still large enough that a cerumen cover 37 having the diameter D1 can still be inserted into the proximal opening 36. The cerumen cover 37 has an inside thread 38 which, in accord with FIG. 12, mates with the outside thread 39 of a proximal screw neck 40 of an in-the-ear hearing aid module 41.

The in-the-ear hearing aid module 41 can now be introduced into the hollow interior 42 of the finished otoplastic shell 35 until the proximal screw neck 40 projects through the hole 28 into the proximal opening 36 of the otoplastic material 31. The cerumen cover 37 can be subsequently screwed onto the screw neck 40. The in-the-ear hearing aid module 41 is thus seated firmly and acoustically tight against the finished otoplastic shell 35.

Figure 13:
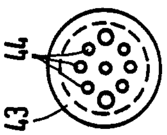
FIG. 13 is a plan view of the cerumen cover of FIG. 12.

In accord with FIG. 13, the end face 43 of the cerumen cover 37 includes sieve-like openings 44. It thus serves as fixing element for the hearing aid module and as cerumen trap.

In FIG. 12, the end face 45 of the in-the-ear hearing aid module 41 has an adjustment knob 46 for a volume control which also operates as the on and off switch for the device, has a further adjustment element 47, a compartment 48 for a battery and an opening 49 for the sound supply.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method for producing an ear impression comprising the steps of:

drawing an over-shell having a proximal hole onto a die simulating the outside contour of the housing of an in-the-ear hearing aid module, said die having a hollow interior, a plate with a stem detachably connected to a distal end of the die, and a connector at its proximal end, said over-shell being drawn thereover such that said hole;

attaching a cap having a through channel on that part of said connector projecting from said hole;

introducing an ear impression material into an auditory canal of a hearing-impaired person;

introducing the combination of said die, said over-shell and said cap into said ear impression material situated in said auditory canal, whereby displaced ear impression material is pressed in distal direction, being partially pressed directly out of said auditory canal and partially through said through channel of said cap into said hollow interior of said die; and, after said ear impression material has hardened, removing said combination of die, over-shell, cap and ear impression material, detaching said cap from said stem and removing excess ear impression material to obtain said ear impression.

2. A method for producing an otoplastic shell comprising the steps of: drawing an over-shell having a proximal hold onto a die simulating the outside contour of the housing of an in-the-ear hearing aid module, said die having a hollow interior, a positioning part having portions projecting therefrom detachably connected to a distal end of the die, and a connector at its proximal end, said over-shell being drawn thereover such that said connector at least partially projects through said hole; attaching a cap having a through channel on that part of said connector projecting from said hole; introducing an ear impression material into an auditory canal of a hearing-impaired person; introducing the combination of said die, said over-shell and said cap into said ear impression material situated in said auditory canal, whereby displaced ear impression material is pressed in distal direction, being partially pressed directly out of said auditory canal and partially through said through channel of said cap into said hollow interior of said die; and, after said ear impression material has hardened, removing said combination of die, over-shell, cap and ear impression material, detaching said cap from said positioning part and removing excess ear impression material to obtain said ear impression; producing a negative of said ear impression by completely surrounding the ear impression with negative casting material, wherein said positioning part leaves marks behind in the negative of said ear impression; casting fluid otoplastic material into the negative; immersing and positioning a combination of a die having an attached positioning part, an over-shell and a cap without a through channel into said fluid otoplastic material such that said positioning part lies in alignment with said position marks of said negative of said ear impression; after hardening of said otoplastic material, removing a blank, comprising said die, said over-shell, said cap, and said otoplastic material from said negative of said ear impression; distally removing said positioning part including potentially projecting otoplastic material from said blank, freeing the proximal end of said blank of otoplastic material and removing said cap and then removing said die in the distal direction, so that said over-shell including said otoplastic material thereon remains as a finished otoplastic shell.

3. A method according to claim 2, wherein said positioning part comprises a fixing star, the fixing star having points which leave fixing troughs behind in said negative as position marks.

4. A method according to claim 3, wherein said fixing star and said ear impression are inserted into a fitting retaining plate such that the star points project out of the rim of the retaining plate so that said ear impression and the projecting points of said fixing star are completely surrounded with negative casting material on said retaining plate; and wherein, after said negative casting material has hardened, said retaining plate together with said fixing star and said ear impression are removed from said hardened negative casting material, so that the negative of said ear impression and of said retaining plate remains together with said fixing depressions deriving from said points of said fixing star.

5. A method according to claim 4, wherein an adhesive is applied to said over-shell for facilitating the adhesion of said ear impression material to said over-shell before the combination composed of the die, over-shell and cap is introduced into said ear impression material.

6. An apparatus for producing an ear impression comprising:

a die simulating the outside contour of the housing of an in-the-ear hearing aid module, said die having a hollow interior, having a plate with a stem detachably attached to its distal end, and having a connector at its proximal end;

an over-shell for receiving therein said die, said over-shell including a proximal hole for passage therethrough of said connector such that a portion of said connector projects completely through said hole; and a cap emplaceable onto that part of said connector projecting therefrom.

7. An apparatus for producing an ear impression comprising: a die simulating the outside contour of the housing of an in-the-ear hearing aid module, said die having a hollow interior, a positioning part detachably attached to its distal end, said positioniong part having portions projecting therefrom, and having a connector at its proximal end; an over-shell for receiving therein said die, said over-shell including a proximal hole for passage therethrough of said connector such that a portion of said connector projects completely through said hole; and a cap emplaceable onto that part of said connector projecting therefrom.

8. An apparatus according to claim 7, wherein said positioning part is a fixed star whose points project therefrom.

9. An apparatus according to claim 8, further comprising a retaining plate fitting to said fixing star with attached ear impression, said fixing star being insertable into said retaining plate such that the star points project out of the rim of said retaining plate.

10. An apparatus according to claim 6, wherein said plate having said stem comprises a vent hole.

* * * * *